UNITED STATES PATENT OFFICE.

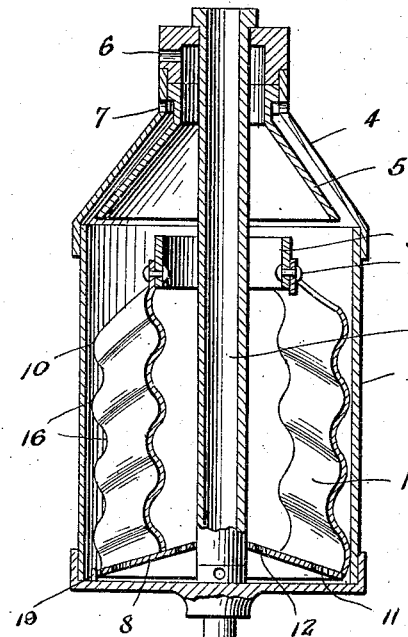
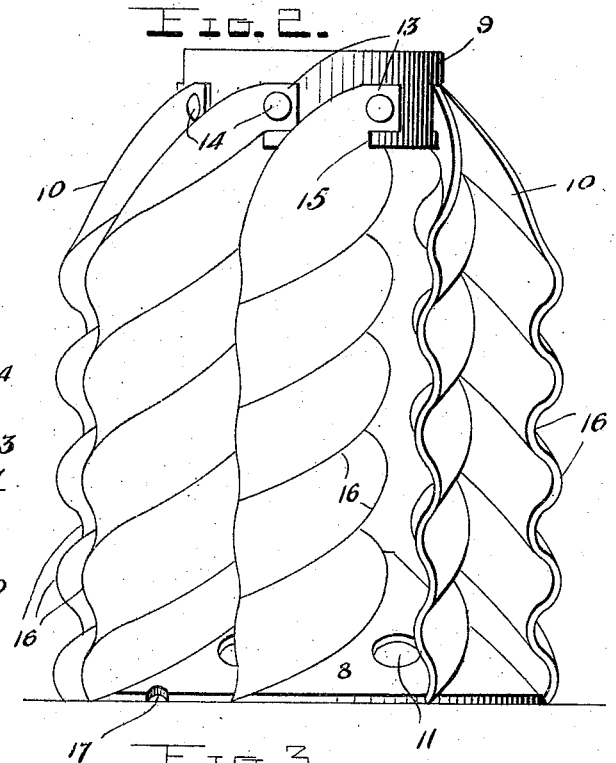
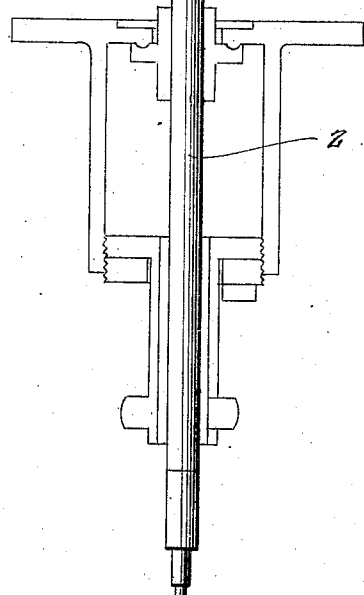
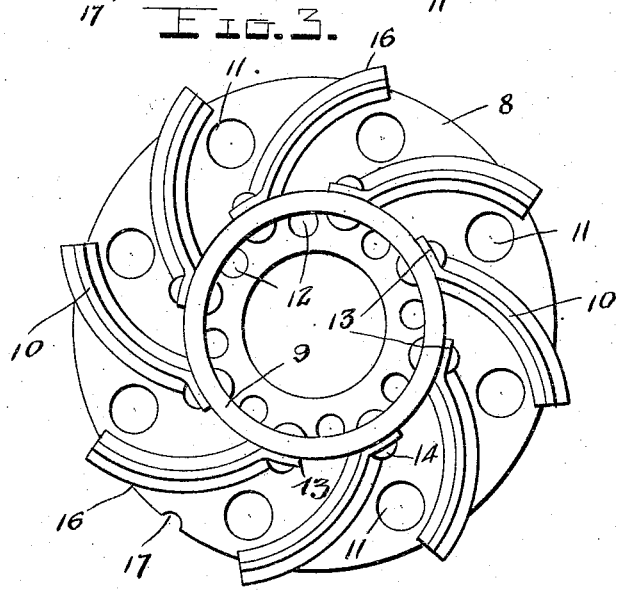

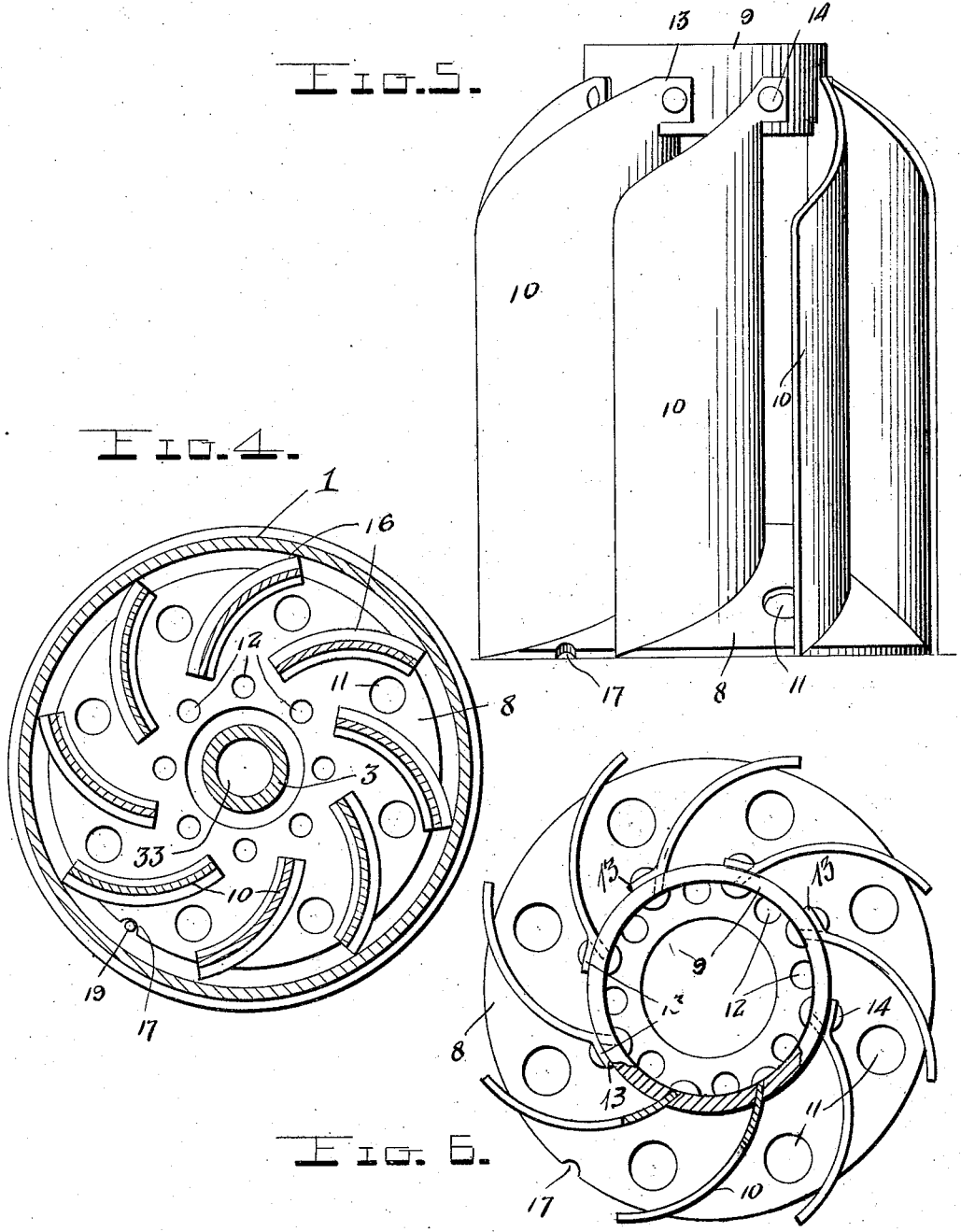

EDGERLY R. BAILEY AND MYRON A. GANIARD, OF CLARINDA, IOWA.

CREAM-SEPARATOR-BOWL LINER.

No. 929,372.   Specification of Letters Patent.   Patented July 27, 1909.

Application filed April 9, 1908. Serial No. 426,156.

To all whom it may concern:

Be it known that we, EDGERLY R. BAILEY and MYRON A. GANIARD, citizens of the United States, residing at Clarinda, in the county of Page and State of Iowa, have invented certain new and useful Improvements in Cream-Separator-Bowl Liners; and we do declare the following to be a full, clear, and exact description of the invention, such as will enable others skilled in the art to which it appertains to make and use the same.

This invention relates to bowl liners for cream separators and has for its object to provide a device of this kind which will partially separate the cream from the milk immediately upon entrance into the bowl and then thoroughly separate the milk from the cream before they leave the bowl.

Another object is to provide means for equally distributing the milk between the wings of the separator.

Another object is to provide novel means for holding the separator wings upon the supporting structure and a novel method of arranging said wings to get the best results.

For these and still other objects which will appear as the description proceeds the invention consists of certain novel features, arrangements and combinations of parts of which the herein described bowl liner is one of many possible embodiments.

While herein the description refers to minute details of the invention, the invention is not limited to these as the details of construction and combination may be greatly varied without departing from the spirit and scope of the invention.

In the annexed drawing forming a part of this specification in which like reference characters refer to like parts throughout the several views and which are for illustrative purposes and therefore not drawn to any particular scale, Figure 1 is a sectional view showing the invention in connection with the bowl of a separator; Fig. 2 is a side elevation of the bowl liner; Fig. 3 is a top plan view of the same; Fig. 4 is a sectional view taken at a point intermediate of the upper and lower rings of Fig. 1; Fig. 5 is a side elevation of a modified form of bowl liner; and, Fig. 6 is a top view of the same partly in section.

Referring more particularly to the drawing, the bowl liner is shown applied to a separator bowl 1 having the usual supporting shaft 2 and a central pipe 3 for the entrance of milk thereinto. The pipe 3 is provided at its lower end with openings through which the milk is adapted to pass. The upper end of the bowl is provided with the usual concentric cones 4 and 5 having outlets 6 and 7.

The liner forming the subject of this invention comprises a bottom cone 8 and a top ring 9 and a plurality of wings 10. The wings 10 are curved to provide outer convex surfaces and are so disposed relative to their coöperating parts as to intersect radially extending planes cutting the axis of the separator. The lower end of the wings 10 are rigidly secured to the bottom cone 8 in any approved manner and extend from the outer edge of said cone to a point substantially midway said outer edge and the axis of the separator bowl of each of said wings. Intermediate the lower and upper edges of said cone but nearer the lower edge thereof are larger openings 11 and between the inner edges of said wings and therefore near the upper edge of said cone are the smaller openings 12, the purpose of which will appear hereinafter. The upper ends of the wings 10 are provided with tangentially extending ears 13 securely fastened to the top ring 9 by means of rivets or the like 14. The lower edge of said top ring is slotted as at 15 to receive the inner edge of the wings 10 whereby said wings are more effectually supported. The outer edges of the wings 10 are adapted to contact the bowl as shown in Fig. 4. The wings 10 may be provided with inclined corrugations 16 as shown in Figs. 1-4, or may be plain as shown in Figs. 5 and 6. The lower edge of the cone 8 is provided with a slot or notch 17 adapted to engage a rib or pin 19 in the bottom of the separator bowl whereby the motion of the bowl is positively communicated to the cone and its coöperating parts.

The operation of the device is as follows. The separator is assembled in the usual way and the milk to be separated is introduced through the pipe 3. The parts are suitably rotated and the milk is thrown out through openings in the lower end of pipe 3 under the cone 8 and the heavier part of the milk or the skimmed milk escapes through the larger perforations 11 and the large portion of the lighter milk or cream which will be separated immediately will pass up through the smaller openings 12. As the milk rises in the bowl, it is carried forward by the wings 10 and the completion of the separation is obtained by the time the milk reaches the top.

The corrugations shown in Figs. 1-4 are designed to assist in retarding the milk in such a manner that the fat globules can readily escape to the center. Any number of wings may be used.

Having thus described our invention, what we claim as new and desire to secure by Letters-Patent is:—

1. In a device of the character described, a lower cone having a large central opening, a top ring having longitudinal slots cut therein, a plurality of curved wings intersecting radially extending planes through the axis of said cone, the lower ends of said wings being rigidly secured to said cone from side to side of said wings, the outer edge of said wings terminating even with the outer edge of said cone and the inner edge of said wings terminating remote from the inner edge of said cone, said wings being received by said slots near the upper ends of said wings, the upper ends of said wings being bent to lie flush against said top ring, rivets to clamp said upper ends to said top ring, said cone being provided with larger perforations between each of said adjacent wings and near the outer edge thereof, said cone being also provided with perforations substantially midway between the inner ends of adjacent wings, said cone being also provided with a notch in the lower edge thereof.

2. In a device of the class described, a bottom cone having a series of small openings arranged near its outer edge and a series of larger openings near its center, a pipe extending through the cone having openings therein, a series of wings having corrugations inclined in a common direction, spaced apart around the pipe and secured to the lower cone, and a top ring having slots for the reception of the upper ends of the wings secured to said wings.

In testimony whereof we have hereunto set our hands in presence of two subscribing witnesses.

EDGERLY R. BAILEY.
MYRON A. GANIARD.

Witnesses:
MINNIE POTTS,
J. E. AUMAN.